US011775508B2

(12) United States Patent
Vlassis

(10) Patent No.: US 11,775,508 B2
(45) Date of Patent: Oct. 3, 2023

(54) SYSTEM AND METHOD FOR AUTOMATING SELF TUNING OF LOG NORMALIZATION ROUTINES FOR SECURITY ANALYSIS

(71) Applicant: JPMorgan Chase Bank, N.A., New York, NY (US)

(72) Inventor: Shaun Vlassis, Concord (AU)

(73) Assignee: JPMORGAN CHASE BANK, N.A., New York, NY (US)

( * ) Notice: Subject to any disclaimer, the term of this patent is extended or adjusted under 35 U.S.C. 154(b) by 133 days.

(21) Appl. No.: 17/339,262

(22) Filed: Jun. 4, 2021

(65) Prior Publication Data

US 2021/0382873 A1 Dec. 9, 2021

Related U.S. Application Data

(60) Provisional application No. 63/035,263, filed on Jun. 5, 2020.

(51) Int. Cl.
*G06F 16/23* (2019.01)
*G06F 16/25* (2019.01)
*G06F 16/178* (2019.01)

(52) U.S. Cl.
CPC ...... *G06F 16/2379* (2019.01); *G06F 16/1794* (2019.01); *G06F 16/258* (2019.01)

(58) Field of Classification Search
CPC . G06F 16/2379; G06F 16/258; G06F 16/1794
See application file for complete search history.

(56) References Cited

U.S. PATENT DOCUMENTS

| 10,929,415 | B1* | 2/2021 | Shcherbakov | ...... G06F 3/04842 |
| 2002/0178253 | A1* | 11/2002 | Sedlack | .............. H04L 41/0226 |
| | | | | 709/224 |
| 2016/0005196 | A1* | 1/2016 | Awadallah | ............ G06T 11/206 |
| | | | | 345/440 |
| 2018/0183766 | A1* | 6/2018 | Crabtree | ............... H04L 9/3236 |

* cited by examiner

*Primary Examiner* — Alford W Kindred
*Assistant Examiner* — Lin Lin M Htay
(74) *Attorney, Agent, or Firm* — GREENBLUM & BERNSTEIN, P.L.C.

(57) ABSTRACT

A system and a method for adjusting an order of parsing rules for routing incoming security logs to log normalization routines that are used for processing large volumes of security incident event data are provided. The method includes: sequentially applying, in a first order, a set of parsing rules to each of a first set of logs to determine destinations that correspond to log normalization routines for reformatting into a common format; determining whether an efficiency of the application of the parsing rules would be increased by reordering into a second order; and reordering the set of parsing rules into the second order based on the determination, so that the parsing rules will be sequentially applied to the next set of logs based on the second order thereof. The efficiency determination is based on volumes and complexities of various log types.

17 Claims, 7 Drawing Sheets

| Log Type | Example – Original Raw Logs |
|---|---|
| SUDO | [Time 2006.12.28 15:54:03 UTC] [Facility local2] [Sender sudo] [PID -1] [Message username : TTY=ttyp1 ; PWD=/Users/username ; USER=root ; COMMAND=/usr/bin/su -] [Level 5] [UID -2] [GID -2] [Host Hostname] |
| Apache | 192.168.2.20 - - [28/Jul/2006:10:27:10 -0300] "GET /cgi-bin/try/ HTTP/1.0" 200 3395 |
| SSH | May 21 20:22:28 slacker2 sshd[8813]: Accepted password for root from 192.168.20.185 port 1066 ssh2 |
| FTP | 14:03:19 192.168.2.187 [62]USER Administrator 331 0 |

| Log Type | Example—Normalized Equivalent |
|---|---|
| SUDO | { "logtype" : "sudo" , "sourceIP" : "Hostname" , "RawMsg" : "[Time 2006.12.28 15:54:03 UTC] [Facility local2] [Sender sudo] [PID-1] [Message username : TTY=ttyp1 ; PWD=/Users/username ; USER=root ; COMMAND=/usr/bin/su -] [Level 5] [UID-2] [GID-2] [Host Hostname]" "timestamp" : "2006.12.28 15:54:03 UTC" , "user" : "root" } |
| Apache | { "logtype" : "apache" , "sourceIP" : "192.168.2.20" , "timestamp" : "28/Jul/2006:10:27:10 -0300" , "RawMsg" : "192.168.2.20 - - [28/Jul/2006:10:27:10 -0300] ″GET /cgi-bin/try HTTP/1.0″ 200 3395" } |
| SSH | { "logtype" : "ssh" , "sourceIP" : "192.168.29.175" , "user" : "root" , "timestamp" : "May 21 20:22:28" , "RawMsg" : "May 21 20:22:28 slacker2 sshd[8813]: Accepted password for root from 192.168.20.185 port 1166 ssh2" } |
| FTP | { "logtype" : "ftp" , "sourceIP" : "192.168.2.187" , "user" : "Administrator" , "timestamp" : "14:03:19" , "RawMsg" : "14:03:19 192.168.2.187 [62]USER Administrator 331 0" } |

FIG. 7

SYSTEM AND METHOD FOR AUTOMATING SELF TUNING OF LOG NORMALIZATION ROUTINES FOR SECURITY ANALYSIS

CROSS-REFERENCE TO RELATED APPLICATIONS

This application claims the benefit of U.S. Provisional Patent Application Ser. No. 63/035,263, filed Jun. 5, 2020, which is hereby incorporated by reference in its entirety.

BACKGROUND

1. Field of the Disclosure

This technology generally relates to methods and systems for performing security incident event management, and more particularly to methods and systems for adjusting an order of parsing rules for routing incoming security logs to log normalization routines that are used for processing large volumes of security incident event data

2. Background Information

Security incident event management is a necessity for tracking, analyzing, and responding to issues and problems that arise in relation to various applications and system types that are used by an organization. The number of such applications and system types varies, but for a large corporate organization that utilizes many different applications and many different types of systems, this number may be in the hundreds or thousands.

When an issue or a problem with respect to an application or system, a security log is generated and transmitted to a security operations team. Each application or system may have a different format for such a log, and as a result, the logs must be normalized into a standard format for efficiency and accuracy in processing. However, the normalization process becomes increasingly complex and voluminous as the number of different types of applications and systems increases, and therefore, for a large number of such applications and systems, the complexity and volume are relatively high.

In order to handle relatively high levels of volume and complexity, a set of parsing rules may be used for ensuring that each respective incoming log is directed to a corresponding log normalization routine. For a particular log, the first parsing rule is applied, and if the log type matches with the normalization routine addressed by the first parsing rule, then that log is forwarded to the corresponding normalization routine, and if not, the second parsing rule is applied. This process continues until the particular log type matches with the correct parsing rule and is thereby directed to the correct log normalization routine.

The efficiency of this process is therefore affected by the order in which the parsing rules are applied to the stream of incoming logs. Conventionally, the order of the parsing rules remains static, because there is no mechanism for adjusting the parsing rule order.

Accordingly, there is a need for a method for reordering parsing rules to be applied to incoming security logs in order to increase efficiency in security log analysis and response.

SUMMARY

The present disclosure, through one or more of its various aspects, embodiments, and/or specific features or sub-components, provides, inter alia, various systems, servers, devices, methods, media, programs, and platforms for adjusting an order of parsing rules for routing incoming security logs to log normalization routines that are used for processing large volumes of security incident event data.

According to an aspect of the present disclosure, a method for determining an order of parsing rules for routing incoming security logs for processing thereof is provided. The method is implemented by at least one processor. The method includes: receiving, by the at least one processor, a first plurality of logs; sequentially applying, by the at least one processor to each log from among the first plurality of logs, a set of parsing rules to determine a respective destination, the set of parsing rules having a first order for application thereof; determining, by the at least one processor for the first plurality of logs, whether an efficiency of the sequential application of the set of parsing rules would be increased by adjusting the first order into a second order; reordering, by the at least one processor, the set of parsing rules into the second order based on a result of the determining; receiving, by the at least one processor, a second plurality of logs; and sequentially applying, by the at least one processor, the reordered set of parsing rules to each log from among the second plurality of logs.

For each log from among the first plurality of logs, the respective destination may correspond to one log normalization routine selected from among a plurality of log normalization routines that are configured to reformat each log into a common format.

The determining of whether the efficiency would be increased may include: determining, for each log from among the first plurality of logs, a respective log type; determining, for the first plurality of logs, a respective volume that corresponds to each determined log type; and adjusting the first order into the second order based on the determined volume for each determined log type.

The method may further include quantifying each determined respective volume as a corresponding data rate for each determined log type. The adjusting of the first order into the second order may be performed based on both of the determined volume and the corresponding data rate for each determined log type.

The determining of whether the efficiency would be increased may include: determining, for each log from among the first plurality of logs, a respective log type; determining, for the first plurality of logs, a respective complexity that corresponds to each determined log type; and adjusting the first order into the second order based on the determined complexity for each determined log type.

The determining of the respective complexity that corresponds to each determined log type may be based on at least one from among an amount of data and a type of data included in each determined log type. The type of data included in each determined log type may include at least one from among text data, voice data, image data, and color data.

The method may further include: translating each determined complexity into a respective equivalent volume for each determined log type; and quantifying each determined respective equivalent volume as a corresponding data rate for each determined log type. The adjusting of the first order into the second order may be performed based on all of the determined complexity, the determined respective equivalent volume, and the corresponding data rate for each determined log type.

The method may further include: determining a first time interval that corresponds to an amount of time during the first plurality of logs is received; assigning all logs received starting immediately after the first time interval has elapsed and ending when a subsequent elapsement of the first interval has occurred to the second plurality of logs; determining, for the second plurality of logs, whether the efficiency of the sequential application of the reordered set of parsing rules would be increased by adjusting the second order into a third order; and reordering the set of parsing rules into the third order based on a result of the determining of whether the efficiency would be increased by adjusting the second order into the third order.

According to another exemplary embodiment, a computing apparatus for determining an order of parsing rules for routing incoming security logs for processing thereof is provided. The computing apparatus includes a processor; a memory; and a communication interface coupled to each of the processor and the memory. The processor is configured to: receive, via the communication interface, a first plurality of logs; sequentially apply, to each log from among the first plurality of logs, a set of parsing rules to determine a respective destination, the set of parsing rules having a first order for application thereof; determine, for the first plurality of logs, whether an efficiency of the sequential application of the set of parsing rules would be increased by adjusting the first order into a second order; reorder the set of parsing rules into the second order based on a result of the determination; receive, via the communication interface, a second plurality of logs; and sequentially apply the reordered set of parsing rules to each log from among the second plurality of logs.

For each log from among the first plurality of logs, the respective destination may correspond to one log normalization routine selected from among a plurality of log normalization routines that are configured to reformat each log into a common format.

The processor may be further configured to determine whether the efficiency would be increased by: determining, for each log from among the first plurality of logs, a respective log type; determining, for the first plurality of logs, a respective volume that corresponds to each determined log type; and adjusting the first order into the second order based on the determined volume for each determined log type.

The processor may be further configured to quantify each determined respective volume as a corresponding data rate for each determined log type, and to perform the adjusting of the first order into the second order based on both of the determined volume and the corresponding data rate for each determined log type.

The processor may be further configured to determine whether the efficiency would be increased by: determining, for each log from among the first plurality of logs, a respective log type; determining, for the first plurality of logs, a respective complexity that corresponds to each determined log type; and adjusting the first order into the second order based on the determined complexity for each determined log type.

The processor may be further configured to determine the respective complexity that corresponds to each determined log type based on at least one from among an amount of data and a type of data included in each determined log type. The type of data included in each determined log type may include at least one from among text data, voice data, image data, and color data.

The processor may be further configured to: translate each determined complexity into a respective equivalent volume for each determined log type; quantify each determined respective equivalent volume as a corresponding data rate for each determined log type; and perform the adjusting of the first order into the second order based on all of the determined complexity, the determined respective equivalent volume, and the corresponding data rate for each determined log type.

The processor may be further configured to: determine a first time interval that corresponds to an amount of time during the first plurality of logs is received; assign all logs received starting immediately after the first time interval has elapsed and ending when a subsequent elapsement of the first interval has occurred to the second plurality of logs; determine, for the second plurality of logs, whether the efficiency of the sequential application of the reordered set of parsing rules would be increased by adjusting the second order into a third order; and reorder the set of parsing rules into the third order based on a result of the determining of whether the efficiency would be increased by adjusting the second order into the third order.

According to yet another exemplary embodiment, a non-transitory computer readable storage medium storing instructions for determining an order of parsing rules for routing incoming security logs for processing thereof is provided. The storage medium includes executable code which, when executed by a processor, causes the processor to: receive a first plurality of logs; sequentially apply, to each log from among the first plurality of logs, a set of parsing rules to determine a respective destination, the set of parsing rules having a first order for application thereof; determine, for the first plurality of logs, whether an efficiency of the sequential application of the set of parsing rules would be increased by adjusting the first order into a second order; reorder the set of parsing rules into the second order based on a result of the determination; receive a second plurality of logs, and sequentially apply the reordered set of parsing rules to each log from among the second plurality of logs.

For each log from among the first plurality of logs, the respective destination may correspond to one log normalization routine selected from among a plurality of log normalization routines that are configured to reformat each log into a common format.

The executable code may be further configured to cause the processor to determine whether the efficiency would be increased by: determining, for each log from among the first plurality of logs, a respective log type; determining, for the first plurality of logs, a respective volume that corresponds to each determined log type; and adjusting the first order into the second order based on the determined volume for each determined log type.

The executable code may be further configured to cause the processor to: determine a first time interval that corresponds to an amount of time during the first plurality of logs is received; assign all logs received starting immediately after the first time interval has elapsed and ending when a subsequent elapsement of the first interval has occurred to the second plurality of logs; determine, for the second plurality of logs, whether the efficiency of the sequential application of the reordered set of parsing rules would be increased by adjusting the second order into a third order; and reorder the set of parsing rules into the third order based on a result of the determination of whether the efficiency would be increased by adjusting the second order into the third order.

BRIEF DESCRIPTION OF THE DRAWINGS

The present disclosure is further described in the detailed description which follows, in reference to the noted plurality

FIG. 6 is a diagram that illustrates examples of original raw logs for several log types of security incident event data to be normalized by using the process of FIG. 5, according to an exemplary embodiment.

FIG. 7 is a diagram that illustrates examples of normalized equivalents of the original raw logs of FIG. 6 for several log types of security incident event data, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
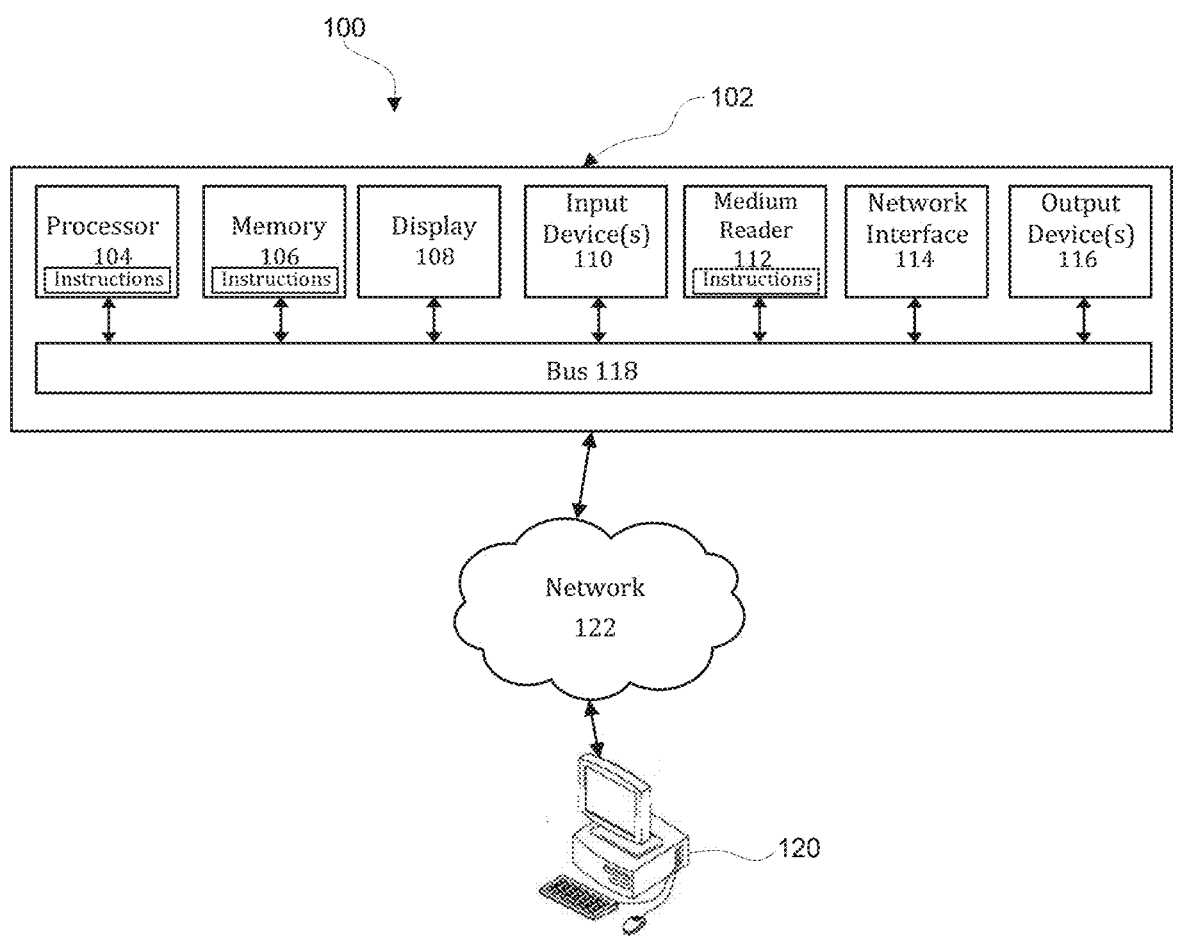
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desk-top computer, a communications device, a wireless smart phone, a personal trusted device, a wearable device, a global positioning satellite (GPS) device, a web appliance, a device that is running the Apple iOS operating system, a device that is running the Android operating system, a device that is capable of running a web browser to connect to the Internet, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, a device that is running the Apple iOS operating system, a device that is running the Android operating system, a device that is capable of running a web browser to connect to the Internet, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for adjusting an order of parsing rules for routing incoming security logs to log normalization routines that are used for processing large volumes of security incident event data.

Figure 2:
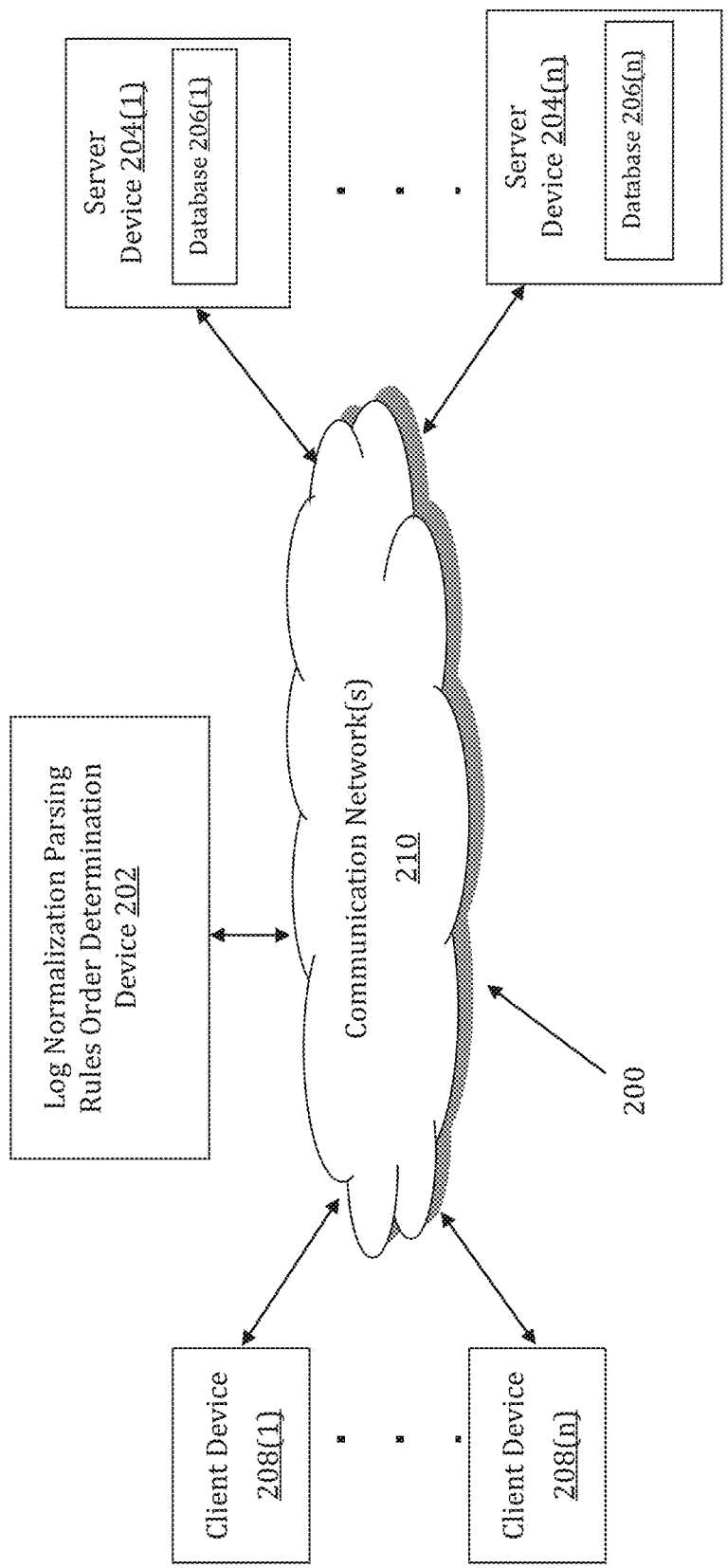
FIG. 2 illustrates an exemplary diagram of a network environment.

Referring to FIG. 2, a schematic of an exemplary network environment 200 for implementing a method for adjusting an order of parsing rules for routing incoming security logs to log normalization routines that are used for processing large volumes of security incident event data is illustrated. In an exemplary embodiment, the method is executable on any networked computer platform, such as, for example, a personal computer (PC), a device that is running the Apple iOS operating system, a device that is running the Android operating system, or a device that is capable of running a web browser to connect to the Internet.

The method for adjusting an order of parsing rules for routing incoming security logs to log normalization routines that are used for processing large volumes of security incident event data may be implemented by a Log Normalization Parsing Rules Order Determination (LNPROD) device 202. The LNPROD device 202 may be the same or similar to the computer system 102 as described with respect to FIG. 1. The LNPROD device 202 may store one or more applications that can include executable instructions that, when executed by the LNPROD device 202, cause the LNPROD device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LNPROD device 202 itself, may be located in virtual server(s) running in a cloud-based computing environment rather than being tied to one or more specific physical network computing devices. Also, the application(s) may be running in one or more virtual machines (VMs) executing on the LNPROD device 202. Additionally, in one or more embodiments of this technology, virtual machine(s) running on the LNPROD device 202 may be managed or supervised by a hypervisor.

In the network environment 200 of FIG. 2, the LNPROD device 202 is coupled to a plurality of server devices 204(1)-204(n) that hosts a plurality of databases 206(1)-206(n), and also to a plurality of client devices 208(1)-208(n) via communication network(s) 210. A communication interface of the LNPROD device 202, such as the network interface 114 of the computer system 102 of FIG. 1, operatively couples and communicates between the LNPROD device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the LNPROD device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and LNPROD devices that efficiently implement methods and systems for adjusting an order of parsing rules for routing incoming security logs to log normalization routines that are used for processing large volumes of security incident event data.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LNPROD device 202 may be a standalone device or integrated with one or more other devices or apparatuses, such as one or more of the server devices 204(1)-204(n), for example. In one particular example, the LNPROD device 202 may include or be hosted by one of the server devices 204(1)-204(n), and other arrangements are also possible. Moreover, one or more of the devices of the LNPROD device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LNPROD device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to log normalization routines, parsing rules, and security log analysis and monitoring.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the LNPROD device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the LNPROD device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the LNPROD device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LNPROD device 202, the server devices 204(1)-204(n), or the client devices 208(1)-208(n), for example, may be configured to operate as virtual instances on the same physical machine. In other words, one or more of the LNPROD device 202, the server devices 204(1)-204(n), or the client devices 208(1)-208(n) may operate on the same physical device rather than as separate devices communicating through communication network(s) 210. Additionally, there may be more or fewer LNPROD devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
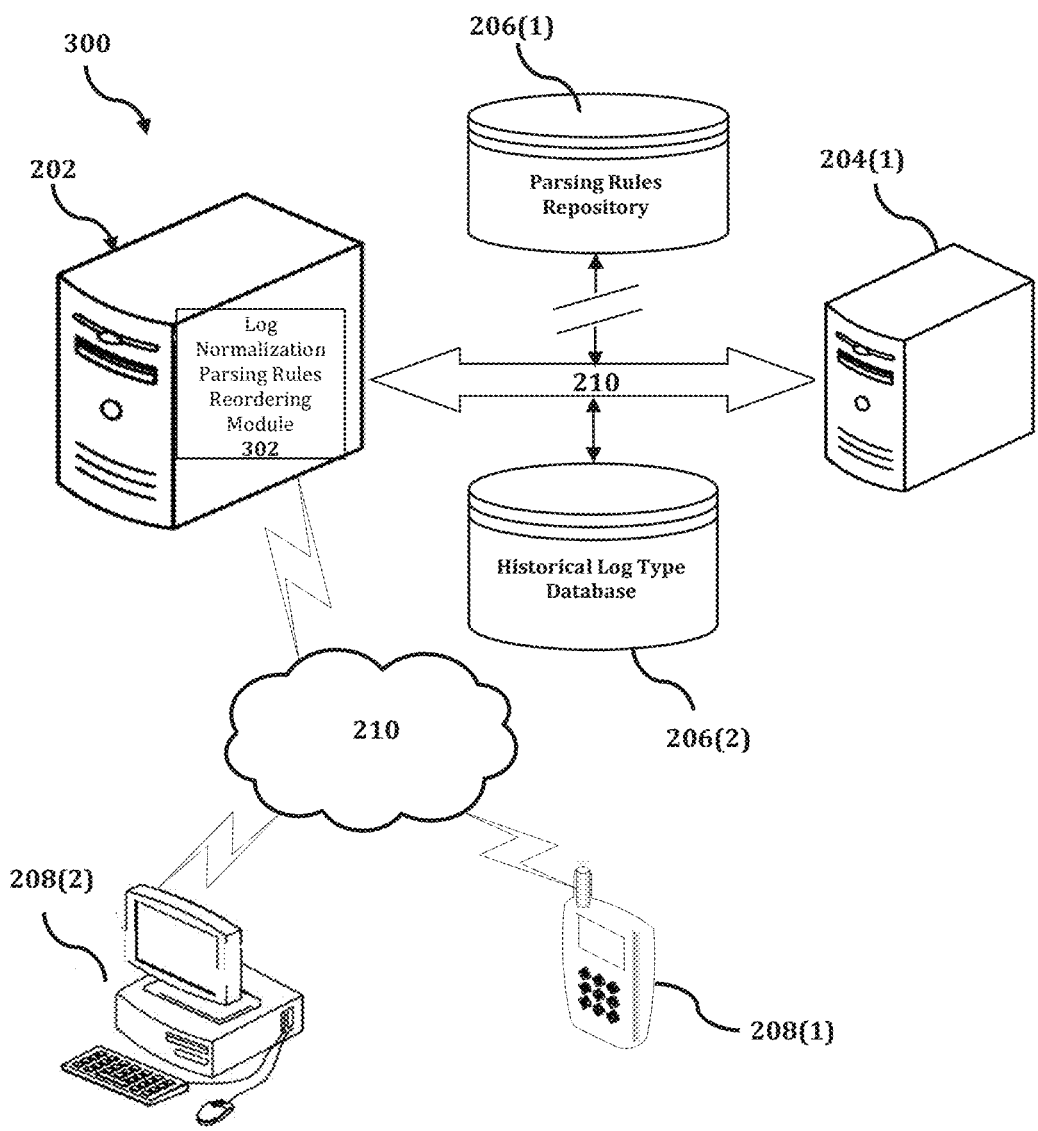
FIG. 3 shows an exemplary system for implementing a method for adjusting an order of parsing rules for routing incoming security logs to log normalization routines that are used for processing large volumes of security incident event data.

The LNPROD device 202 is described and illustrated in FIG. 3 as including a log normalization parsing rules reordering module 302, although it may include other rules, policies, modules, databases, or applications, for example. As will be described below, the log normalization parsing rules reordering module 302 is configured to implement a method for adjusting an order of parsing rules for routing incoming security logs to log normalization routines that are used for processing large volumes of security incident event data.

An exemplary process 300 for implementing a mechanism for adjusting an order of parsing rules for routing incoming security logs to log normalization routines that are used for processing large volumes of security incident event data by utilizing the network environment of FIG. 2 is illustrated as being executed in FIG. 3. Specifically, a first client device 208(1) and a second client device 208(2) are illustrated as being in communication with LNPROD device 202. In this regard, the first client device 208(1) and the second client device 208(2) may be "clients" of the LNPROD device 202 and are described herein as such. Nevertheless, it is to be known and understood that the first client device 208(1) and/or the second client device 208(2) need not necessarily be "clients" of the LNPROD device 202, or any entity described in association therewith herein.

Any additional or alternative relationship may exist between either or both of the first client device 208(1) and the second client device 208(2) and the LNPROD device 202, or no relationship may exist. For example, the LNPROD device 202 and the first client device 208(1) may be configured as the same physical device.

Further, LNPROD device 202 is illustrated as being able to access a parsing rules repository 206(1) and a historical log type database 206(2). The log normalization parsing rules reordering module 302 may be configured to access these databases for implementing a method for adjusting an order of parsing rules for routing incoming security logs to log normalization routines that are used for processing large volumes of security incident event data.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the LNPROD device 202 via broadband or cellular communication. Alternatively, the process may be executed by the LNPROD device 202 in a standalone manner, e.g., by a smart phone on which the log normalization parsing rules reordering module 302 has been downloaded. Of course, these embodiments are merely exemplary and are not limiting or exhaustive.

Upon being started, a processor that is hosted in the LNPROD device 202 executes a process for adjusting an order of parsing rules for routing incoming security logs to log normalization routines that are used for processing large volumes of security incident event data. An exemplary process for adjusting an order of parsing rules for routing incoming security logs to log normalization routines that are used for processing large volumes of security incident event data is generally indicated at flowchart 400 in FIG. 4.

Figure 4:
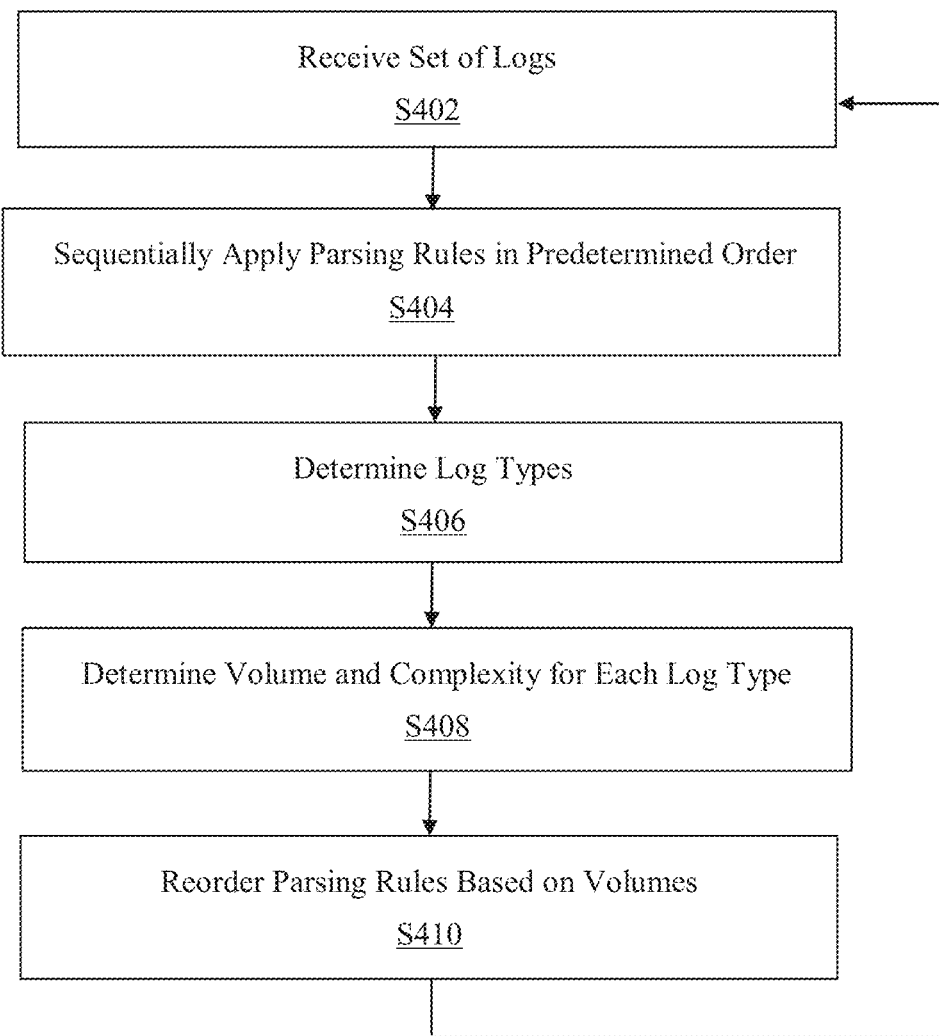
FIG. 4 is a flowchart of an exemplary process for implementing a method for adjusting an order of parsing rules for routing incoming security logs to log normalization routines that are used for processing large volumes of security incident event data.

In process 400 of FIG. 4, at step S402, the log normalization parsing rules reordering module 302 receives a set of logs. In an exemplary embodiment, for a relatively large corporate organization, there may be hundreds or thousands of applications and/or system types that generate logs, and there may be one central destination, such as, for example, a security operations department, for receiving the logs.

At step S404, the log normalization parsing rules reordering module 302 sequentially applies a set of parsing rules to the incoming logs in a predetermined order, and at step S406, the log normalization parsing rules reordering module 302 determines a respective log type for each incoming log. The parsing rules are designed to make the determinations of the log types. In an exemplary embodiment, each log type corresponds to a log normalization routine that is designed to reformat incoming logs into a common format, such as, for example, a Common Information Model (CIM).

As an example, the received set of logs may include three types of logs: Log Type a, Log Type b, and Log Type c. The parsing rules may include three rules: A first rule may be designed to determine whether or not a particular log is a Type a log; a second rule may be designed to determine whether or not a particular log is a Type b log; and a third rule may be designed to determine whether or not a particular log is a Type c log. Accordingly, in this example, when a Type b log is received in step S402, then at step S404, the parsing rules are sequentially applied as follows: The first rule is applied, and a determination is made that the log is not a Type a log; the second rule is applied, and a determination is made that the log is a Type b log (i.e., step S406). As a result of the positive determination that the log is a Type b log, there is no need to apply the third rule.

At step S408, the log normalization parsing rules reordering module 302 determines a respective volume and a respective complexity for each log type. The volume may be quantified as a data rate. The complexity may be determined based on an amount of data included in a log type, types of data (e.g., text, voice, image, color, etc.), and/or any other suitable criterion that relates to complexity. Further, the complexity may be translated into an equivalent volume that may also be quantified as a data rate. For the example described above, the log normalization parsing rules reordering module 302 may determine that for the past 60 minutes, the volume of Type a logs is 1 mb/s; the volume of Type b logs is 2 mb/s; and the volume of Type c logs is 200 mb/s. As another example, the number of log types may be in the hundreds or thousands, and the corresponding volumes and complexities may vary widely.

At step S410, the log normalization parsing rules reordering module 302 uses the determined volumes for each log type to adjust the order of the parsing rules. For the example described above, the volume of Type c logs is much greater than the volumes of both Type a logs and Type b logs, but because of the order of the parsing rules, the Type c logs are subjected to the two parsing rules relating to Type a logs and Type b logs before a positive determination is made that the logs are indeed Type c logs. In this aspect, the log normalization parsing rules reordering module 302 may determine that by reordering the parsing rules so that the Type c determination rule is applied first (instead of third), the Type b determination rule is applied second, and the Type a determination rule is applied third (instead of first), such a reordering would significantly reduce the number of negative determinations, i.e., that a particular log does not belong to the log type being tested, and thereby increase overall system efficiency.

After step S410, the process returns to step S402 in order to process the next set of logs based on the newly reordered parsing rules. In an exemplary embodiment, the number of logs to be processed may be based on a predetermined time interval that corresponds to a desired frequency for adjusting the order of the parsing rules, such as, for example, once every 24 hours, once every 12 hours, once every hour, once every 30 minutes, or once every 10 minutes. In this aspect, when the volumes of various log types are highly variable, a relatively high frequency for adjusting the order of the parsing rules will typically increase the efficiency of the overall process of reformatting the logs into the common format.

In an exemplary embodiment, the determinations of log type-specific volumes and the results of reordering the parsing rules are stored in the historical log type database 206(2), for later use in connection with machine learning techniques. The data stored in the historical log type database 206(2) may be used as an input to a machine learning algorithm that is incorporated into the log normalization parsing rules module 302 for improving an accuracy of the adjustment of the parsing rules order in step S410. In this aspect, the process 400 may implement a self-learning attribute that effectively provides self-learning code for log analysis and processing.

Figure 5:
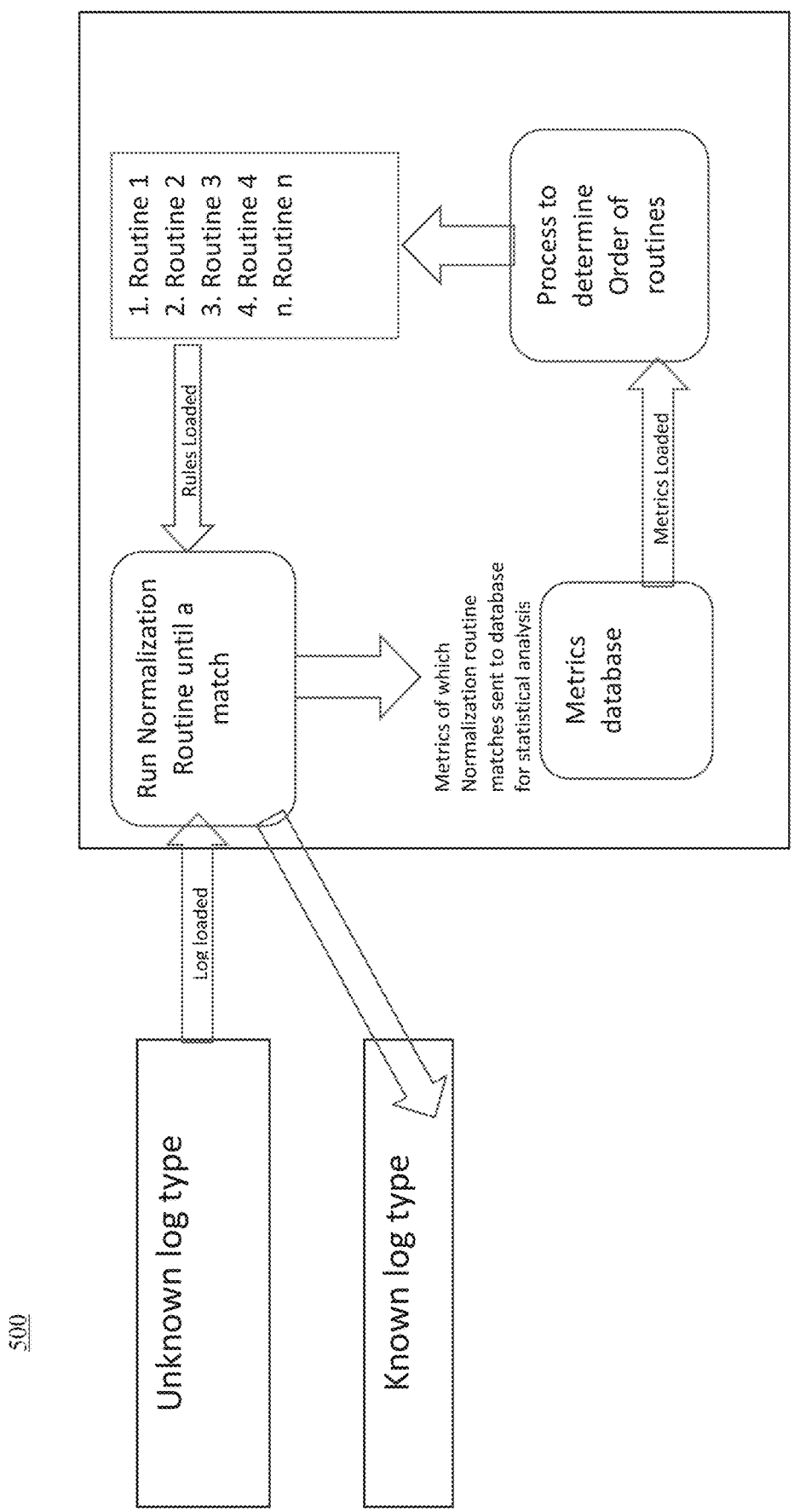
FIG. 5 is a data flow diagram of a process for adjusting an order of parsing rules for routing incoming security logs to log normalization routines that are used for processing large volumes of security incident event data, according to an exemplary embodiment.

FIG. 5 is a data flow diagram 500 of a process for adjusting an order of parsing rules for routing incoming security logs to log normalization routines that are used for processing large volumes of security incident event data, according to an exemplary embodiment. As illustrated in data flow diagram 500, when a log of an unknown type is received, the log is loaded into a processor that runs a sequence of normalization routines to normalize the log data into a common format. The sequence of normalization routines is applied in an order, and when a correct normalization routine is determined as matching the inputted log, the log data is then normalized into a common format and then returned to a destination system.

The normalization routine also forwards metrics that are generated as a result of the matching and normalization functions to a metrics database for statistical analysis. The metrics are then provided as inputs to a process for adjusting the order of the sequence of normalization routines, such as, for example, the process 400 that is implemented by the log normalization parsing rules reordering module 302. The result of this process is an adjusted sequential order of normalization routines, which is then provided to the processor that runs the sequence of normalization routines when a new input log of unknown type is subsequently received.

FIG. 6 is a diagram 600 that illustrates examples of original raw logs for several log types of security incident event data to be normalized by using the process of FIG. 5, according to an exemplary embodiment. As illustrated in FIG. 6, raw log data for a SUDO log type, an Apache log type, an SSH log type, and an FTP log type is shown. Each example log type includes a time stamp, a user, and a source, but the information is presented in respective formats that vary significantly. In this regard, within each log, there is no standardization of the location or specification of the information that is necessary for proper understanding of what is actually occurring. For accuracy and consistency of machine processing of the information, it is important to convert the format of each log type into a common format.

FIG. 7 is a diagram 700 that illustrates examples of normalized equivalents of the original raw logs of FIG. 6 for several log types of security incident event data, according to an exemplary embodiment. As illustrated in FIG. 7, the log data for each of the SUDO log type, the Apache log type, the SSH log type, and the FTP log type have been normalized so that all log types have a common data format. Normalized logs follow a consistent naming convention for the specific fields, thereby enabling accurate and efficient machine processing and decision making. In an exemplary embodiment, each routine applied performs the parsing that is required in order to transform an original log into a normalized representation while retaining the original log for audit purposes.

Accordingly, with this technology, an optimized process for adjusting an order of parsing rules for routing incoming security logs to log normalization routines that are used for processing large volumes of security incident event data is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure.

Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for determining an order of parsing rules for routing incoming security logs for processing thereof, the method being implemented by at least one processor, the method comprising:

receiving, by the at least one processor, a first plurality of logs;

sequentially applying, by the at least one processor to each log from among the first plurality of logs, a set of parsing rules to determine a respective destination, the set of parsing rules having a first order for application thereof;

determining, by the at least one processor for the first plurality of logs, whether an efficiency of the sequential application of the set of parsing rules would be increased by adjusting the first order into a second order;

reordering, by the at least one processor, the set of parsing rules into the second order based on a result of the determining;

receiving, by the at least one processor, a second plurality of logs; and sequentially applying, by the at least one processor, the reordered set of parsing rules to each log from among the second plurality of logs,
wherein the determining whether the efficiency would be increased comprises:
determining, for each log from among the first plurality of logs, a respective log type;
determining, for the first plurality of logs, a respective volume that corresponds to each determined log type; and
adjusting the first order into the second order based on the determined volume for each determined log type.

2. The method of claim 1, wherein for each log from among the first plurality of logs, the respective destination corresponds to one log normalization routine selected from among a plurality of log normalization routines that are configured to reformat each log into a common format.

3. The method of claim 1, further comprising quantifying each determined respective volume as a corresponding data rate for each determined log type, wherein the adjusting of the first order into the second order is performed based on both of the determined volume and the corresponding data rate for each determined log type.

4. The method of claim 1, wherein the determining whether the efficiency would be increased comprises:
determining, for each log from among the first plurality of logs, a respective log type;
determining, for the first plurality of logs, a respective complexity that corresponds to each determined log type; and
adjusting the first order into the second order based on the determined complexity for each determined log type.

5. The method of claim 4, wherein the determining of the respective complexity that corresponds to each determined log type is based on at least one from among an amount of data and a type of data included in each determined log type, and
wherein the type of data included in each determined log type includes at least one from among text data, voice data, image data, and color data.

6. The method of claim 5, further comprising:
translating each determined complexity into a respective equivalent volume for each determined log type; and
quantifying each determined respective equivalent volume as a corresponding data rate for each determined log type,
wherein the adjusting of the first order into the second order is performed based on all of the determined complexity, the determined respective equivalent volume, and the corresponding data rate for each determined log type.

7. The method of claim 1, further comprising:
determining a first time interval that corresponds to an amount of time during the first plurality of logs is received;
assigning all logs received starting immediately after the first time interval has elapsed and ending when a subsequent elapsement of the first interval has occurred to the second plurality of logs;
determining, for the second plurality of logs, whether the efficiency of the sequential application of the reordered set of parsing rules would be increased by adjusting the second order into a third order; and reordering the set of parsing rules into the third order based on a result of the determining of whether the efficiency would be increased by adjusting the second order into the third order.

8. A computing apparatus for determining an order of parsing rules for routing incoming security logs for processing thereof, the computing apparatus comprising:
a processor;
a memory; and
a communication interface coupled to each of the processor and the memory,
wherein the processor is configured to:
receive, via the communication interface, a first plurality of logs;
sequentially apply, to each log from among the first plurality of logs, a set of parsing rules to determine a respective destination, the set of parsing rules having a first order for application thereof;
determine, for the first plurality of logs, whether an efficiency of the sequential application of the set of parsing rules would be increased by adjusting the first order into a second order;
reorder the set of parsing rules into the second order based on a result of the determination;
receive, via the communication interface, a second plurality of logs; and
sequentially apply the reordered set of parsing rules to each log from among the second plurality of logs,
wherein the processor is further configured to determine whether the efficiency would be increased by:
determining, for each log from among the first plurality of logs, a respective log type;
determining, for the first plurality of logs, a respective volume that corresponds to each determined log type; and
adjusting the first order into the second order based on the determined volume for each determined log type.

9. The computing apparatus of claim 8, wherein for each log from among the first plurality of logs, the respective destination corresponds to one log normalization routine selected from among a plurality of log normalization routines that are configured to reformat each log into a common format.

10. The computing apparatus of claim 8, wherein the processor is further configured to quantify each determined respective volume as a corresponding data rate for each determined log type, and to perform the adjusting of the first order into the second order based on both of the determined volume and the corresponding data rate for each determined log type.

11. The computing apparatus of claim 8, wherein the processor is further configured to determine whether the efficiency would be increased by:
determining, for each log from among the first plurality of logs, a respective log type;
determining, for the first plurality of logs, a respective complexity that corresponds to each determined log type; and
adjusting the first order into the second order based on the determined complexity for each determined log type.

12. The computing apparatus of claim 11, wherein the processor is further configured to determine the respective complexity that corresponds to each determined log type based on at least one from among an amount of data and a type of data included in each determined log type, and wherein the type of data included in each determined log type includes at least one from among text data, voice data, image data, and color data.

13. The computing apparatus of claim 12, wherein the processor is further configured to:
translate each determined complexity into a respective equivalent volume for each determined log type;
quantify each determined respective equivalent volume as a corresponding data rate for each determined log type; and
perform the adjusting of the first order into the second order based on all of the determined complexity, the determined respective equivalent volume, and the corresponding data rate for each determined log type.

14. The computing apparatus of claim 8, wherein the processor is further configured to:
determine a first time interval that corresponds to an amount of time during the first plurality of logs is received;
assign all logs received starting immediately after the first time interval has elapsed and ending when a subsequent elapsement of the first interval has occurred to the second plurality of logs;
determine, for the second plurality of logs, whether the efficiency of the sequential application of the reordered set of parsing rules would be increased by adjusting the second order into a third order; and
reorder the set of parsing rules into the third order based on a result of the determining of whether the efficiency would be increased by adjusting the second order into the third order.

15. A non-transitory computer readable storage medium storing instructions for determining an order of parsing rules for routing incoming security logs for processing thereof, the storage medium comprising executable code which, when executed by a processor, causes the processor to:
receive a first plurality of logs;
sequentially apply, to each log from among the first plurality of logs, a set of parsing rules to determine a respective destination, the set of parsing rules having a first order for application thereof;
determine, for the first plurality of logs, whether an efficiency of the sequential application of the set of parsing rules would be increased by adjusting the first order into a second order;
reorder the set of parsing rules into the second order based on a result of the determination;
receive a second plurality of logs; and
sequentially apply the reordered set of parsing rules to each log from among the second plurality of logs,
wherein the executable code is further configured to cause the processor to determine whether the efficiency would be increased by:
determining, for each log from among the first plurality of logs, a respective log type;
determining, for the first plurality of logs, a respective volume that corresponds to each determined log type; and
adjusting the first order into the second order based on the determined volume for each determined log type.

16. The storage medium of claim 15, wherein for each log from among the first plurality of logs, the respective destination corresponds to one log normalization routine selected from among a plurality of log normalization routines that are configured to reformat each log into a common format.

17. The storage medium of claim 15, wherein the executable code is further configured to cause the processor to:
determine a first time interval that corresponds to an amount of time during the first plurality of logs is received;
assign all logs received starting immediately after the first time interval has elapsed and ending when a subsequent elapsement of the first interval has occurred to the second plurality of logs;
determine, for the second plurality of logs, whether the efficiency of the sequential application of the reordered set of parsing rules would be increased by adjusting the second order into a third order; and
reorder the set of parsing rules into the third order based on a result of the determination of whether the efficiency would be increased by adjusting the second order into the third order.

* * * * *